United States Patent [19]

Stoërk

[11] Patent Number: 4,688,886

[45] Date of Patent: Aug. 25, 1987

[54] DEVICE FOR HOLDING TWO LIGHT WAVEGUIDES CONNECTED TO ONE ANOTHER BY A SPLICE

[75] Inventor: Peter Stoërk, Eurasburg, Fed. Rep. of Germany

[73] Assignee: Siemens Aktiengesellschaft, Berlin and Munich, Fed. Rep. of Germany

[21] Appl. No.: 765,950

[22] Filed: Aug. 15, 1985

[30] Foreign Application Priority Data

Aug. 30, 1984 [DE]  Fed. Rep. of Germany ....... 3431937

[51] Int. Cl.$^4$ ................................................ G02B 6/38
[52] U.S. Cl. .................................................. 350/96.21
[58] Field of Search ................ 350/96.20, 96.21, 96.22

[56] References Cited

U.S. PATENT DOCUMENTS

| 4,057,448 | 11/1977 | Miller | 156/158 |
| 4,322,127 | 3/1982 | Comerford et al. | 350/96.21 |
| 4,383,736 | 5/1983 | Forman | 350/96.21 X |
| 4,478,486 | 10/1984 | Fentress et al. | 350/96.20 |
| 4,489,830 | 12/1984 | Charlebois et al. | 350/96.21 X |
| 4,506,946 | 3/1985 | Hodge | 350/96.21 |
| 4,593,972 | 6/1986 | Gibson | 350/96.21 |
| 4,594,121 | 6/1986 | Mitch | 350/96.21 X |

FOREIGN PATENT DOCUMENTS

| 2846951 | 4/1980 | Fed. Rep. of Germany ... 350/96.21 |
| 2087681 | 6/1982 | United Kingdom . | |

OTHER PUBLICATIONS

Archer et al., "Optische Fasertechnik, Stecker und Spleisse", *Elektrisches Nachrichtenwesen*, vol. 56, No. 4, 1981, pp. 358–363.
Patent Abstracts of Japan, vol. 7, No. 2, Jan. 7, 1983, p. 166—Abstract of Japanese Printed Application 57—163211 or 7—10—1982.

*Primary Examiner*—William L. Sikes
*Assistant Examiner*—frank González
*Attorney, Agent, or Firm*—Hill, Van Santen, Steadman & Simpson

[57] ABSTRACT

A device which is particularly useful in an assembly for receiving and protecting a splice connection between electro-optical components characterized by a strain-relief element and a holding fixture for receiving the strain-relief element. The strain-relief element preferably has two cylindrical carriers interconnected by a band-like middle piece and the holding fixture has a cavity with two holding portions for receiving the cylindrical carrier with the distance between the holding portions being less than the distance between the carriers when the strain-relief element is in an unflexed state so that the band-like middle piece and waveguide portion between the carrier are held in a bent configuration when the strain-relief element is inserted in the fixture.

19 Claims, 7 Drawing Figures

DEVICE FOR HOLDING TWO LIGHT WAVEGUIDES CONNECTED TO ONE ANOTHER BY A SPLICE

BACKGROUND OF THE INVENTION

The present invention is directed to a fixture or a device for holding two light waveguides connected to one another by a splice, particularly light waveguides formed by optical fibers which are each provided with at least one cladding particularly in the form of a protective hose or jacket.

A fixture for holding two light waveguides, which are connected together by a splice, is known, for example, from the periodical *Elektrisches Nachrichtenwesen*, Vol. 56, No. 4, 1981, pp. 361–363. According to the known method for making a splice, the fiber ends are freed of a secondary and/or primary cladding before splicing, are then notched and broken in a suitable fashion. The fibers prepared in this way are inserted into a V-grooves, are aligned relative to one another with a micromanipulator and are separatd in the axial direction. The fibers are then connected to one another by means of a weld connection. Finally, the spliced fiber is accommodated in a socket or bush-shaped housing which extends between the mutually aligned optical fibers which are provided with a cladding.

It is also known from the same reference to employ a less stable coupling or housing in order to protect splices in a regenerative housing. This coupling should be able to accept a larger loop of monomode fibers in order to avoid additional attenuation due to too small a bending radius of the loop.

SUMMARY OF THE INVENTION

The object of the present invention is to design a fixture or device for holding two light waveguides connected to one another by a splice so that the most space-saving structure possible occurs given a curved guidance of at least one of the light waveguides. In particular, a small as possible diameter of a loop given a prescribed minimum radius should occur for an arrangement wherein the splice is disposed in the course of a curved light waveguide connection.

To accomplish these goals, the present invention is directed to a fixture or device for holding two light waveguides connected to one another by a splice and particularly light waveguides formed from optical fibers which are provided with at least one cladding adjacent to the splice, said device comprising a strain-relief element and a holding fixture which preferably has a cavity and receives the strain-relief element. The strain-relief element comprises two carriers spaced apart by a band-shaped middle piece with each of said carriers having means for forming a connection with the cladding or jacket of the respective light waveguide. The holding fixture including two holding portions or cavities is rigidly connected to one another with each of the holding portions receiving a carrier and the spacing between the holding portions being smaller than the spacing between the carrier when the flexible band-shaped middle piece is in a non-curved position. Thus, when the stress-relief element inserted in the holding fixture with the holding portion receiving the carriers, the band-shaped middle piece has at least a portion in a curved configuration.

From the basis of the structure, the device has the advantage that given prescribed dimensions for the arrangement with a splice, a prescribed, minimum bending radius which is of significant importance for the time yield and for low attenuation of the optical fibers can be obtained given a particularly low space requirement.

In a further development of the invention, when the strain-relief element is inserted into the holding fixture, a middle piece of the strain-relief element will lie against a planar side face of the cavity of the holding fixture in a subregion enclosing the splice location of the optical fiber so that the splice location is mechanically stressed to a particularly low degree.

When a light waveguide having a curved configuration is to be connected to a light waveguide which has a straight configuration, then the holders of the holding fixture are disposed such that one end and a central region of the middle piece press against a planar side face of the holding fixture. Thus, the middle piece has a curved course or portion at the other end region.

In another development of the invention, both the holder portions are disposed in the cavity so that the middle piece of the stress-relief element which is inserted into the holding fixture, presses against a planar side face of the cavity in a central sub-region and is curved toward one and the same side in both end regions. As a result of these measures, a particularly space-saving structure is provided by the arrangement of the fixture or device and the course of a light waveguide connection will be curved.

The apparatus further also can be designed so that at least one of the carriers has a shape of a cylinder and that the band-like middle piece connects in a radial direction to a lower region of each of the cylindrical carriers and stands in a plane which includes the axis of the cylindrical carrier and is substantially perpendicular to a plane of a the base of the cylindrical carrier. Such a strain-relief element can be manufactured in a simple fashion as an injected molded plastic part and is effectively protected against bending in directions in which the light waveguide is exposed to tensile stresses.

The apparatus is expediently designed so that the cylindrical carriers are provided with a slot in an upper part to form the means for engaging the waveguides. The slot is aligned with the band-shaped middle piece and its width is at the most equal to or somewhat smaller than the diameter of the allocated cladding. On the basis of these measures, an advantage in obtained in that the tolerance for the outer dimensions of the claddings of the light waveguide can be compensated to a particular degree in the carriers of the holding fixture.

Another expedient development of the apparatus is that the holding portions each have side walls having a U-shaped profile with a floor and that the side wall is provided with a recess or notch in its upper region. This recess or notch is arranged at the side opposite the middle piece of the strain-relief element which is inserted into the holding fixture and it provides space for the waveguide to leave the device.

In another development of the invention, the holding fixture has a shape of a tub with the cavity having angled end regions extending from each holding portion to a narrow center portion. The fixture also has a plate or collar proceeding from an upper inside edge with the outer limits of this collar being aligned with the outside contours of the holder portions. This holding fixture has a high-shaped stability and can be manufactured as an injection-molded plastic part in a simple fashion so that it manages with particularly low-wall thicknesses.

The invention is also directed to a method of assembling the device on a splice while the splice is being made in a splicing apparatus. With the waveguides still being held by the splicing device after making the splice connection, the method comprises the step of securing the strain-relief element to the spliced waveguides by having the carriers each connected to the waveguide on opposite sides of the splice. Then the strain-relief element is inserted into the holding fixture with the band-shaped middle piece being bent in the desired configuration and subsequently the holding fixture is filled with a permanent elastic casting compound. To facilitate in the engagement of the fibers, a quick-setting adhesive can be utilized for securing each of the carriers to the cladding of the fibers.

The splice can be held and protected in this fashion by means of an apparatus with a low number of method steps and involves very little time. The device can be employed in an assembly with particular advantages for splices between electro-optical components, particularly transmission or reception modules of electro-optical communication transmission technology. This assembly includes a preassembled light waveguide plug which will have a waveguide spliced to a pigtail of a component.

BRIEF DESCRIPTION OF THE DRAWINGS

FIG. 7 is a perspective view of an assembly utilizing the device of the present invention.

DESCRIPTION OF THE PREFERRED EMBODIMENTS

Figure 1:
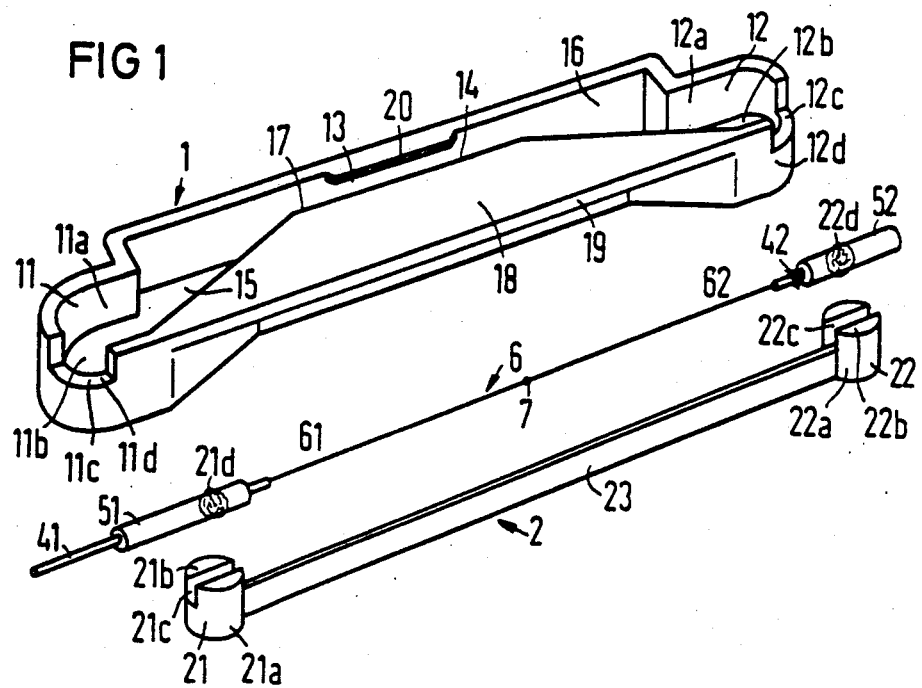
FIG. 1 is a perspective view of a disassembled device in accordance with the present invention including a holding fixture, a spliced waveguide and a strain-relief element.
Figure 2:
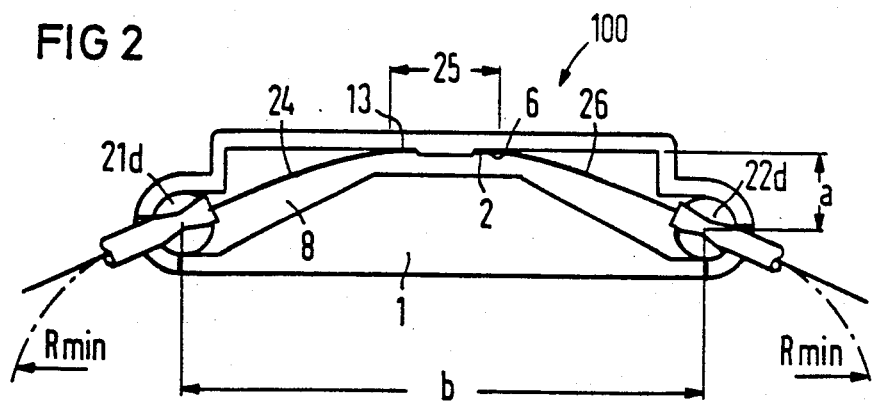
FIG. 2 is a plan view of the device of FIG. 1 in an assembled condition.

The principles of the present invention are particularly useful in a device generally indicated at 100 in FIG. 2 for protecting a spliced-together light waveguide element 6 (best illustrated in FIG. 1).

Light waveguides 61 and 62 formed by optical fibers are connected to one another by a splice which can be by welding at a splice location 7 with the assistance of a standard splicing apparatus and form the light waveguide element 6. The light waveguides 61 and 62, which have been spliced together in the area of the splice, have been stripped of their protective cladding jacket or coatings which may include a primary cladding or jacket 41 and 42, respectively, and a secondary or outer protective jacket or hose 51 and 52.

In order to protect the spliced waveguide element 6, the device 100 includes a housing or fixture 1 and a strain-relief or stress-relief element 2. The strain-relief element 2 has two carriers 21 and 22 which are interconnected by a flexible band-shaped middle piece 23. The carriers 21 and 22 are each provided with means for engaging the cladding 51 and 52 of the two light waveguides 61 and 62 while they are still secured in a splicing apparatus or device (not shown). After securing the carriers 21 and 22 to the claddings 51 and 52, the waveguides are released from the splicing apparatus and the strain-relief element 2 can then be inserted into the holding fixture 1.

The holding fixture 1 has the shape of a tub with a cavity with angled end regions 15 and 16 which have holding portions 11 and 12, respectively. The holding portions 11 and 12 receive the carriers 21 and 22. Along an upper inside edge 17 the holding fixture 1 has a plate or gusset 18 which has a trapezoidal shape as illustrated in FIGS. 1 and 2 and has an outer edge 19 which is aligned with the outer contours 11d and 12d of the holder portions 11 and 12.

As best illustrated in FIG. 2, a mutual spacing b of the holder portions 11 and 12 is smaller than the mutual spacing of the carriers 21 and 22 when the strain-relief element 2 is in an unstressed or unflexed condition. Thus, the strain-relief element 2 can only be inserted into the holding fixture 1 in a bent condition. Since the light waveguide element 6 is situated next to the middle piece 23 which is constructed as a band, it is not stressed in either tension or compression due to only a slight possible bending of the band.

As illustrated in FIG. 2, when the strain-relief element 2 is inserted into the housing fixture 1, the middle piece 23 lies against a planar side face 13 of a center portion or central sub-region 25 of a cavity of the fixture 1, which portion 25 encompasses the splice location 7 of the light waveguides 61 and 62. The side face 13 is situated as an inside surface of a back wall 14 and the portion 25 of the cavity has a shape of a narrow groove. Both the holding portions 11 and 12 are disposed such that the center piece 23 of the stress-relief element 2 presses against the planar side face 13 of the holding fixture 1 in the subregion 25 and is curved toward one and the same side in both regions 24 and 26. A spacing a which is the distance of the axis of the holders 11 and 12 from the planar side face 13 and the mutual spacing b between the holding portions 11 and 12 define the bending line of the light waveguide element 6 in the region of the fixture or device 100. The angle is established in accordance with the spacing a and b. The minimum radius $R_{min}$ applies to the optical fibers in its furthest course outside of the device 100.

The carriers 21 and 22 preferably have a cylindrical shape. A band-shaped middle piece 23 is connected in a radial direction to a lower region 21a and 22a of the cylindrically-shaped carriers 21 and 22 as best illustrated in FIG. 1. The band also extends upright to a plane which is defined by a base of each of the cylindrical carriers 21 and 22. In other words, the band extends in the plane defined by the axis of the cylinders forming the carriers 21 and 22. In an upper portion 21b and 22b, respectively, each of the cylindrical carriers 21 and 22 is provided with a slot 21c or 22c which is aligned with the band-shaped middle portion 23. The width of the slot is somewhat smaller than the diameter of the allocated cladding or jacket 51 and 52, respectively.

Figure 3:
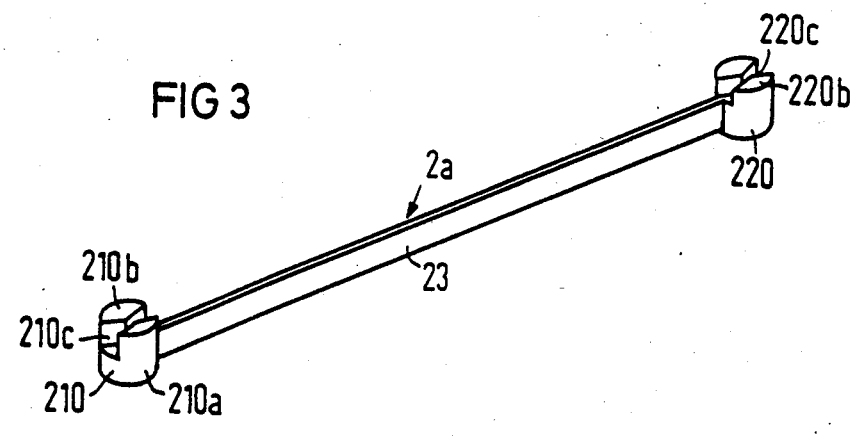
FIG. 3 is a perspective view of a modification of the strain-relief element of the invention.

In accordance with FIG. 1, the identical carriers 21 and 22 can be employed for optical fibers having a protective jacket of different thicknesses in that a thinner protective jacket 41 is provided with a sleeve 51 and this is secured at a bonding location by means of a quick-setting glue so that the desired thickness is produced. In a modified strain-relief element generally indicated at 2a in FIG. 3, smaller differences in the thicknesses can be compensated. As illustrated, the strain-relief element 2a has two cylindrical carriers 210 and 220 which are interconnected by the middle piece 23. As in the previously described embodiment, the carrier 210 has a lower cylindrical portion 210a and an upper portion 210b. In a similar manner, the carrier 220 has a lower cylindrical portion and an upper cylindrical portion 220b. The web of the middle piece 23 is connected between the lower portions. The upper portions 210b and 220b are provided with slots 210c and 220c, respectively. The slots 210c and 220c unlike the slots 21c and 22c converge inwardly from each end so they have a "hour-glass configuration" with a narrow portion. The width of the narrow portion is selected to be less than the diameter of the cladding 51 so that the cladding is firmly received or pinched therein.

Figure 5:
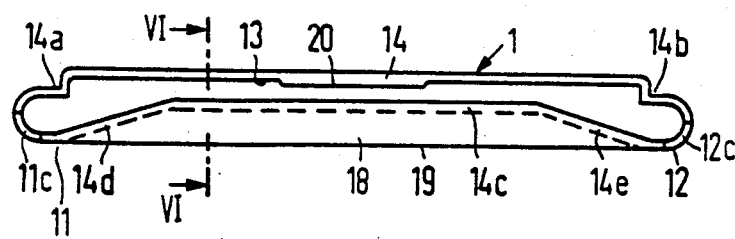
FIG. 5 is a plan view of a holding fixture of the invention.

Each of the holding portions 11 and 12, as best illustrated in FIG. 5, have a U-shaped configuration formed by side walls 11a and 12a, respectively. The side walls 11a and 12a extend upwardly from a floor portion 11b and 12b. In an upper region, each of the side walls 11a and 12a is provided with a recess or notch 11c and 12c (FIG. 1) which basically is opposite the middle piece 23 when the strain-relief element 2 is inserted in the cavity of the holding fixture.

Figure 4:
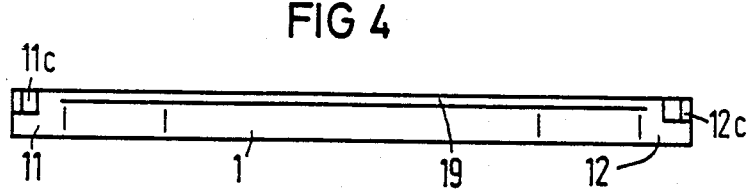
FIG. 4 is a side view of a holding fixture in accordance with the present invention.
Figure 6:
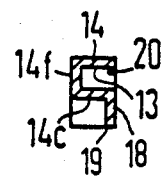
FIG. 6 is a cross-sectional view taken along the lines VI—VI of FIG. 5.

As best illustrated in FIGS. 4, 5 and 6, the plate or gusset 18 is at the upper edge or top surface of the holding fixture 1. In addition, the plate or gusset 18 extends between the holding portions 11 and 12. The holding fixture 1 has a cavity or recess which has a planar side face 13 formed by a back wall 14. The holding portions 11 and 12 have the U-shaped profile and have an opening of the U facing one another with the legs of a U shape being offset from the back wall 14 by short end walls 14a and 14b, respectively. The other side wall of the holding portions 11a and 11b are connected by slanting walls 14d and 14e to a front wall 14c which is spaced from the back wall 14. The front wall 14c and the back wall 14 form a groove or slot which receives both the bent middle piece and the waveguide gripped in the stress-relief element 2. As illustrated, the gusset or plate 18 is connected to the upper edges of the wall portions 14c, 14d and 14e. From FIG. 6, it is seen that the base of the narrow portion formed by the walls 14 and 14c have a floor 14f which is in the same plane as the floor 11b and 12b of the holding portions 11 and 12. Finally, the back wall 14 is provided with one or more ribs 20 which prevents the optical fiber from projecting out of the cavity formed by the walls 14 and 14c.

The device is expediently employed in the following fashion when producing a splice. First, the splice is produced in a standard fashion in a splicing device. After the splice has been formed, the strain-relief element 2 which has a length dependent upon the length of the splice and has the carriers 21 and 22 structured in response to the diameter of the claddings such as 51 and 52 in secured to the splice of waveguide element by having the claddings 51 and 52 secured to the carriers 21 and 22 such as by a quick-setting glue. The splice waveguide element which is now secured to the relief element 21 is then released from the splicing device and can be mounted in the holding fixture 1. The holding fixture 1 effects a bending of the band-shaped middle piece 22 and also of the optical fibers 61 and 62 which are connected to one another. As a result of the corresponding design dimensions of the holding fixture 1 and the strain-relief element 2, the spliced optical fibers 61 and 62 are pressed against the planar face 13 in the holding fixture 1 in the region of the splice or, respectively, the joined location 7 and are only conducted in the required radius of curvature. Finally, the holding fixture can be filled with a casting compound for better protection of the optical fibers 61 and 62. This casting compound being expediently permanently elastic and made of silicone.

The following method steps occur for the arrangement as illustrated in FIG. 1. The optical fiber 61 which has a cladding 41 which is too thin for the holder is provided with the sleeve such as 51. The optical fibers 61 and 62 are connected to one another by welding. Subsequently, the strain-relief element 2 is pressed onto the spliced waveguide element with the carriers 21 and 22 receiving the waveguides in their respective slots. The cable ends are then secured to the carriers 21 and 22 with a quick-setting glue. The strain-relief or stress-relief element 2 is taken from the welding device and is then inserted into the holding fixture 1. Subsequently, the holding fixture 1 is filled with casting compound such as a silicone casting compound. As mentioned hereinbefore, one or more ribs 20 are provided on a top edge of the back wall 12 and these serve the function of preventing the optical fiber from projecting out of the groove before the filling of the groove with the casting compound.

The quick-setting glue also expediently moistens the synthetic fibers of the cable which fibers serve as stress-relief members which may have been exposed or moistens other synthetic fibers of the cable so that the outer cladding is rigidly connected to the carriers of the strain-relief element 2. When the optical fiber is loosely received in the cladding, the optical fibers 61 and 62 are expediently rigidly connected to the strain-relief element 2 in order to prevent the bent element 6 from shifting for stress-relief in the cladding 51 or, respectively, 52 and thus shortening the straight length of the fiber 6 which lies against the face 13. This rigid connection is preferably indirectly undertaken in that the optical fibers 61 and 62 are glued to their respective claddings or sleeves 51 and 52 at their exit location.

The device of fixture 100 is particularly useful in an assembly wherein it is utilized in conjunction with the splice which is disposed between a pigtail of a transmission module and a pigtail of a premounted light waveguide plug. As illustrated in FIG. 7, an assembly 9 has a premounted light waveguide plug 91 which has a pigtail or waveguide connected to a pigtail 92 of a laser module 93 by a splice which is received in the holding fixture 1. As illustrated, the holding fixture enables the provision of an excess waveguide which is held in a loop of the required radius of curvature which is particularly small in an advantageous fashion.

Although various minor modifications may be suggested by those versed in the art, it should be understood that I wish to embody within the scope of the patent granted hereon, all such modifications as reasonably and properly come within the scope of my contribution to the art.

I CLAIM:

1. A device for holding two light waveguides connected to one another by a splice, each of said light waveguides being provided with at least one layer of cladding material, said device comprising a strain-relief element and a holding fixture for receiving the strain-relief element, said strain-relief element having two carriers interconnected by a flexible band-shaped middle piece, each of said carriers having means for fastening the carrier to the cladding of the respective light waveguides, said holding fixture having two holding portions rigidly connected to one another, each of said holding portions having a cavity for receiving the carrier as the strain-relief element is inserted into the holding fixture, said holding portions having a spacing therebetween smaller than the spacing between the pair of carriers when the strain-relief element is in an unbent position so that when the strain-relief element is inserted in the holding fixture, the band-shaped middle piece and the waveguide secured to the strain-relief element are in a curved condition.

2. A device according to claim 1, wherein at least one of the carriers has a shape of a cylinder and said band-like middle piece extends from a lower range of the cylinder radially therefrom with the band being in a plane extending along the axis of the cylinder.

3. A device according to claim 2, wherein the means for fastening includes an upper portion of the cylinder of the carrier being provided with a slot extending in the plane of the band-shaped middle piece, said slot having a width equal to or less than the diameter of the cladding.

4. A device according to claim 3, wherein said slot tapers inward from each end to provide a narrow portion and an hour-glass configuration, the width of said narrow portion being less than the diameter of the cladding so that when the cladding is received in the slot it is in a pinched condition.

5. A device according to claim 1, wherein the holding fixture has a planar wall surface and a portion of the middle piece of the strain-relief element is pressed against the planar wall surface in a sub-region encompassing the splice location with the insertion of the element into the holding fixture.

6. A device according to claim 5, wherein the holding portions of the holding fixture are disposed relative to the planar wall surface so that curved portions of the flexible middle piece curve toward one and the same side in both end regions.

7. A device according to claim 6, wherein each of the holding portions has a side wall having a U-shaped profile closed by a floor, said holder portions being positioned in the holding fixture with the open portion of the U-shaped profile extending toward each other, each of the side walls of the holding portions having a notch in an upper region disposed in a portion of the side wall opposite to the direction of the middle piece of the strain-relief element when inserted in the fixture, said notch providing clearance for a waveguide engaged by the carriers.

8. A device according to claim 7, wherein the holding fixture has a shape of a tub with a cavity having angled end regions adjacent each of the holding portions and connected by a narrow portion, said fixture having a plate extending along a upper inside edge of the cavity with an outer edge of the plate being aligned with an outer contour of each of the holding portions.

9. A device according to claim 1, wherein each of the carriers of the strain-relief element are cylinders having parallelly extending axes, said band-like middle piece extending radially from the axis of each cylinder from a lower portion of each cylinder with the band lying in a plane including the axis of the cylinder, each of the carriers in a portion of the cylinder opposite the connection to the band having means for engaging the cladding of the waveguide.

10. A device according to claim 9, wherein the means for engaging comprises a slot in another portion of the cylinder aligned with the band-shaped middle piece, said slot having a width equal to or somewhat smaller than the diameter of the cladding being engaged.

11. A device according to claim 10, wherein said slot converges inwardly from each end to a narrow portion to provide an hour-glass configuration with the narrow portion of the slot being less than the diameter of the cladding so that a portion of the cladding is in tight engagement in the slot.

12. A device according to claim 9, wherein the holding fixture has a tub-shaped member with a cavity having the holding portions at each end, each holding portion being formed by a side wall having a U-shaped profile and a bottom wall, each of said holding portions being interconnected by a portion of the cavity having a planar wall engaged by the band-shaped middle piece of the strain-relief element when inserted therein, each of the side walls of the holding portion having a notch to allow clearance for the waveguide engaged by the cylindrical carrier.

13. A device according to claim 12, wherein the portion of the cavity interconnecting the holding portion at each end has a triangular portion extending to a narrow center portion, said fixture including a reinforcing plate adjacent an open edge extending between a wall of the narrow center portion and a wall of each of the triangular portions.

14. A device according to claim 12, wherein the means for engaging include a slot in an upper portion of the cylindrical carrier member, said slot having a width equal to or less than the diameter of the jacket of the waveguide.

15. A method for holding a splice portion of two waveguides in a device having a strain-relief element received in a cavity of a holding fixture, said strain-relief element having a pair of carriers interconnected by a flexible band middle piece and said holding fixture having a pair of holding portions in the cavity for receiving the carriers and being spaced apart a distance less than the distance between the carriers when the strain-relief element is in an unbent position, said method comprising the steps of subsequent to forming a splice between two waveguide elements, receiving portions of the waveguide elements on both sides of the splice region in to the carriers of the strain-relief element with the splice portion therebetween, inserting the strain-relief element into the holding fixture with a desired curvature of the flexible band-like middle piece and the waveguide element; and then subsequently filling the cavity of the holding fixture with a casting compound.

16. A method according to claim 15, wherein the step of securing includes applying a quick-setting adhesive to the carrier and portion of the waveguide engaged thereby.

17. A method according to claim 15, wherein the step of filling includes applying a permanent elastic casting compound.

18. A method according to claim 15, wherein the step of securing is performed while the spliced waveguide elements are still held in the splicing device and the method includes releasing the spliced waveguide elements from the splicing device after securing so that the strain-relief element can be inserted into the holding fixture.

19. An assembly having a premounted light waveguide plug and an optical component having a pigtail extending therebetween, said pigtail being spliced to a waveguide of the light waveguide plug to form a splice connection, said splice connection being received in a device having a strain-relief element, a holding fixture for receiving the strain-relief element, said strain-relief element having a pair of carriers interconnected by a band-like flexible middle piece, each of said carriers having means for gripping a portion of the waveguides adjacent to the splice location with the splice location interposed between the pair of carriers, said holding fixture having a cavity with holding portions for receiving the carriers when the strain-relief element is inserted in the holding fixture, said holding portions being interconnected by a cavity portion and the distance between the holding portions being less than the distance between the carriers of the strain-relief element in an unflexed state so that with the insertion of the strain-relief element, the flexible middle piece and the waveguide between the carriers is bent to th desired configuration.

* * * * *